March 27, 1956  E. J. PARKER  2,739,916

METHOD OF MAKING FILTER CARTRIDGES

Filed Dec. 8, 1953

INVENTOR.
ELLIOT J. PARKER
BY
*Charles E. Willson*
ATTORNEY

United States Patent Office 2,739,916
Patented Mar. 27, 1956

2,739,916
METHOD OF MAKING FILTER CARTRIDGES

Elliot J. Parker, Narberth, Pa., assignor to Fram Corporation, Providence, R. I., a corporation of Rhode Island Application December 8, 1953, Serial No. 396,845

2 Claims. (Cl. 154—81)

This invention relates to filter cartridges, and more particularly to a method of firmly securing metal closure discs to the opposite ends of a porous filter element formed of a pleated fibrous sheet. The filter cartridge contemplated by the present invention may be employed to filter gases such as air, or liquids such as lubricating oils for motor vehicles and aircrafts. It is also well adapted to filter liquid fuels and hydraulic liquids.

It has been proposed heretofore to provide filter cartridges comprising a central tube about which is provided an annulus formed of a pleated porous sheet of paper having the pleats extending parallel to the axis of the annulus. This type of cartridge is commonly placed in a liquid filter casing so that the liquid to be filtered surrounds the annulus and passes inwardly through the porous sheet to a central tube, from which the filtered oil passes out of the filter casing. In such a construction in which the flow is outside in or in a similar construction in which the flow is inside out, it is important to provide a closure in the form of a disc or cap at each end of the annulus so that the oil to be filtered cannot pass around these ends.

It has been suggested heretofore to provide caps for closing the opposite ends of the pleated annulus filter and to employ a phenol formaldehyde resin as an adhesive for bonding the caps to the zigzag pleated ends of the annulus. Phenol formaldehyde, of the type used for this purpose, requires a catalyst in order to obtain a satisfactory cure of the resin along with a heat cure. This leads to a practical difficulty in the manufacture of such filter cartridges because when the equipment is shut down at the end of a day's run, the phenol formaldehyde resin sets to an irreversible solid, which is difficult to remove from the applicating vessel before starting up the next run of the equipment. Also it is difficult to secure a satisfactory bond between phenol formaldehyde and metal.

To overcome these difficulties, applicant uses a thermoplastic adhesive and sealer of a type which has been employed heretofore as a molding material applied to conductor wires to form an insulating jacket; but so far as I know, has not been heretofore employed as an adhesive and sealer. I have found that a thermoplastic resin such as a plastisol or organosol, preferably the former, makes a very satisfactory adhesive and sealer that may be used to bond a sheet metal disc or cap firmly to each end of a pleated annulus formed of a porous paper or web as above described. Such a plastisol is essentially a solvent-free material formed by the dispersion of finely powdered hard copolymer resin in suitable plasticizers (Wakeman, The Chemistry of Commercial Plastics, 1947 pp. 350, 351.

To accomplish this, it is necessary to cover the face of the sheet metal disc, which is to be bonded to the pleated annulus, with a thin lacquer film preferably formed of a vinyl resin. A plastisol paste will not bond firmly to a smooth metal surface but will bond to a vinyl lacquer film. After the lacquer film has dried or has been baked on the cap, there is applied to this face of the disc a layer of a plastisol or organosol in the form of a viscous paste, which may be applied at room temperature. If this layer of paste should tend to run down the pleated sheets, due to the force of gravity, this may be prevented by applying a gelling agent to the paste, or sufficient heat to gel the paste without melting the vinyl resin. However, if the paste used is sufficiently viscous, this gelling step will be unnecessary. After a lacquer film, preferably formed of a vinyl resin and which need not be more than one thousandth (.001) of an inch thick, has been applied to one face of the sheet metal disc, and a layer of the plastisol or organosol paste several hundredths of an inch thick has been applied over this lacquer film, the metal discs may be attached to the ends of the pleated cartridge by merely pressing the discs thereagainst so that the zigzag ends of the pleated annulus will engage the resinous paste.

After a metal cap has been attached to each end of the pleated annulus in the manner just described, the cartridge thus formed is preferably placed in an upright position between a lower supporting plate and an upper plate, and sufficient pressure is applied to imbed the ends of the pleats in the resinous paste. These plates are preferably heated to about 350 to 500° F. to soften quickly the vinyl resin and thereby transform the resin to a continuous phase that will form a strong, tough, durable bond between the metal disc or cap and the pleated annulus.

The accompanying drawing illustrates one good practical embodiment of the present invention which will now be described, and wherein.

Figure 1:
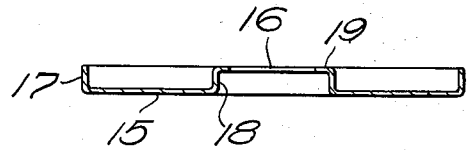
Fig. 1 is a transverse sectional view through a metal closure disc or cap for one end of the cartridge.
Figure 2:
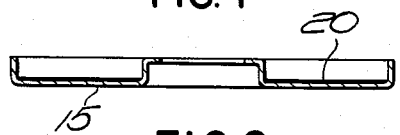
Fig. 2 is a view similar to Fig. 1 but shows the inner cupped face of the disc as having a thin film of lacquer applied thereto.

Referring to the drawing, 10 designates generally a filter element formed of a porous pleated paper or web having the pleats 11 formed so that when a strip of this pleated material is bent to the shape of an annulus, the pleats will extend parallel to the longitudinal axis of the annulus as shown. One end of this pleated strip preferably lies in a fold of the other end portion of the strip, as indicated by 12.

This pleated porous strip 10 preferably encircles a rigid tubular member 13 which may be a metal or a fibrous tube, and this tube is provided with numerous perforations 14 through which the filtered oil may pass. This tube, as shown, is formed of metal and is corrugated throughout its length, and the inner wall of the pleated annulus 10 contacts the corrugations of this tube as shown. When the annulus 10 is formed of porous paper, this paper is preferably treated with a resin that will impart thereto a substantial amount of physical strength and toughness and will render the paper resistant, when used to filter oil, to softening in the presence of water and oil and such chemicals as may be present in the lubricating or other oil being filtered.

The filter cartridge illustrated in the drawing is of the so-called surface type designed for use in a full-flow oil filter in which the oil to be filtered enters the filtering container so that it surrounds the cartridge and passes inwardly through the walls of the pleats 11 to reach the tube 13 and pass through the apertures 14 formed therein.

Figure 4:
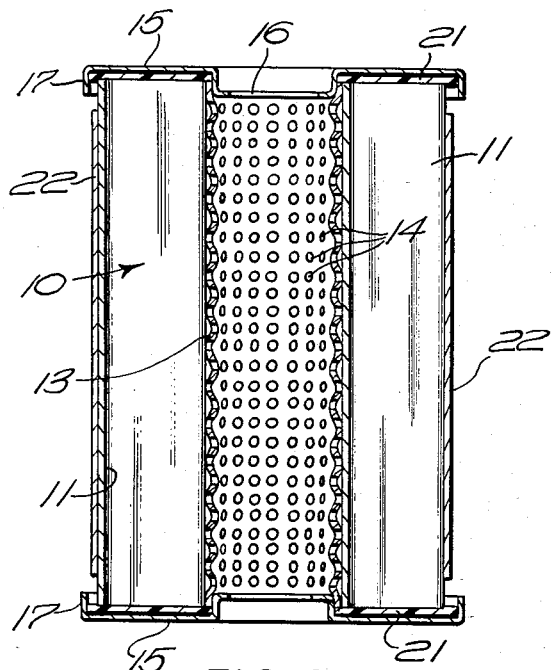
Fig. 4 is a vertical sectional view through a filter cartridge having the discs of Fig. 3 applied to each end thereof.
Figure 5:
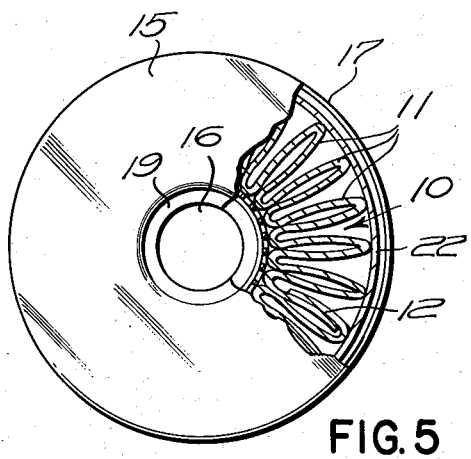
Fig. 5 is a top plan view of Fig. 4 with portion of the upper cap broken away.

In a filter cartridge which operates as just described, it is important to provide a closure for the opposite ends thereof so that the oil being filtered cannot escape around the ends of the pleats 11 and enter the tube 13 that is designed to receive the filtered oil. In accordance with the present invention each end of the pleated annulus 10 is closed with a metal disc or cap 15 having a central opening 16 which serves to receive the oil outlet pipe, not shown. This disc 15 is shown as having its outer periphery bent to provide the laterally extending flange 17, and its inner periphery bent to form the flange 18 which extends in the same direction, and this flange 18 has the laterally extending annular lip 19. The arrangement is such that the annular flange 18 fits in the end of the tube 13 and serves to center the tube as shown in Fig. 4.

Figure 6:
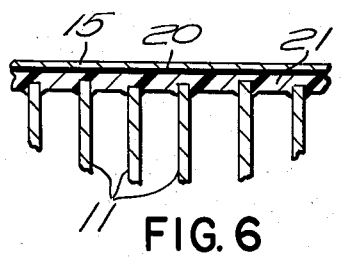
Fig. 6, on a larger scale, is a vertical sectional view through a portion of the upper cap and the sheets of pleated paper bonded thereto.

It is important to secure a disc 15 firmly to each end of the pleated annulus 10, and this is done in accordance with the present invention by applying to the inner face of each disc 15 a thin coat of lacquer which need not be more than one thousandth (.001) of an inch thick. This lacquer film may be allowed to dry in place or may be baked. The lacquer used for this purpose is preferably formed of a vinyl resin to which a solvent is applied to provide a solution or dispersion; but while a vinyl lacquer is preferred, other lacquers which may be either natural or synthetic and which are compatible with the plastisol or organosol may be used. Over the face of the lacquer 20 is applied, as by spreading, a layer of a vinyl paste 21 which may be several hundredths of an inch thick. This vinyl paste may be applied at room temperature, whereupon each end disc so prepared may be pressed against an end of the pleated annulus, as shown in Fig. 4. The cartridge thus formed is then placed in an upright position between a lower supporting plate and an upper pressure plate which operate to exert sufficient pressure upon the discs 15 to imbed the pleats 11 in the paste 21, as shown in Fig. 6. These pressure plates are preferably heated to a temperature of from 350 to 500° F. so that they will quickly heat the paste to the vinyl softening point and thereby transform the resin to a continuous phase and form a strong, tough, durable seal between the zigzag ends of the pleats 11 of the annulus and the metal discs 15. This seal in addition to forming a tight joint will firmly retain the ends of the pleats 11 in place. If it should be desired to omit the lacquer treatment just mentioned, a face of the metal disc 15 may be roughened or scored so that the paste 21 when applied directly thereto can grip the same.

The annulus 10 is shown as surrounded by a protecting cover 22 which may be formed of metal or tough paper adapted to protect the pleats 11 when the filter is being handled and shipped. This cover is applied before the end discs 15 are applied, and the ends of this cover are shown as spaced from the discs 15 to provide an entrance through which the oil can reach the annulus 10.

The bonding agent 21 applied to the discs 10 in the form of a viscous paste is preferably a plastisol formed of a vinyl resin powder which is suspended in a non-aqueous liquid that does not dissolve the resin at room temperature. Here the liquid phase consists only of the plasticizer. A good plastisol for the present purpose is formed of 50 parts by weight of polyvinyl chloride resin and 50 parts of dioctyl phthalate, although other formulations using a vinyl resin may be used. Plastisols have been described heretofore as dispersions of high molecular weight vinyl chloride polymer or co-polymer resins in liquid plasticizers. In practice stabilizers, pigments and other modifiers are included as is well known in the art. The materials are usually milled in a paint or rubber mill in order to get a good dispersion.

While a plastisol is preferred because it is free of volatized agents, it may be desirable to add a volatile agent to secure the desired viscosity. Therefore, an organosol containing a volatile agent may be used. One advantage of using a plastisol or organosol as contemplated by the present invention is that either may be applied to the discs at room temperature. Since plastisols do not evaporate, they will remain for a long time in the desired viscous condition for easy application to the discs. Furthermore, since plastisols are free of volatile agents, the heat treated end product will not shrink as drying occurs. Another advantage of using a plastisol or organosol paste results from the fact that they have a fast flow or good profile transfer, which enables the paste to penetrate deep into the pores of the paper forming the pleats 11 to produce a strong mechanical bond therewith, and to also bond strongly to the lacquer film above mentioned.

Figure 3:
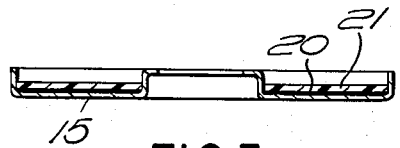
Fig. 3 is a view similar to Fig. 2 but shows the disc as having a layer of a resinous paste applied over the lacquer film.

As above stated, if difficulty is experienced due to the tendency of the paste to drip from the upper disc 15 or run down the sheets 11, this may be prevented by causing the paste 21 to gel while it lies in the disc 15 as shown in Fig. 3. This may be done by adding a gelling agent to the paste, or by heating the paste to a point below the vinyl softening point.

An operating internal combustion engine will heat its lubricating oil but the temperature of the oil stream should not rise above about 200° F., which is far below the temperature at which plastisol becomes soft.

While the method of the present invention has been described as employed to form an oil filter cartridge, it is equally as well adapted to form air cartridges used to filter the air supplied to the carburetors of internal combustion engines, and it may also be employed to form filter cartridges for fuel oils and hydraulic oils.

Having thus described my invention, what I claim and desire to protect by Letters Patent is:

1. In a filter element the method of securing metal closure discs to the ends of an annulus of porous pleated fibrous material having the pleats extending lengthwise of the annulus, which comprises providing a metal disc for each end of the annulus, coating one face of each disc with a lacquer film, applying a layer of a solvent-free paste formed of a vinyl resin powder and a plasticizer over the lacquer film, forcing this coated face against the zigzag end folds of the annulus to embed the end folds in the paste, and heating the disc while it is held against said end to the vinyl softening point to thereby transform the resin from a liquid dispersion to a continuous phase that will penetrate deep into the porous fibrous material and will also bond firmly to the lacquer film on the disc.

2. In a filter element the method of securing metal closure discs to the ends of an annulus of porous pleated fibrous material having the pleats extending lengthwise of the annulus, which comprises providing a metal disc for each end of the annulus, coating one face of each disc with a lacquer film, applying a layer of a solvent-free paste formed of a vinyl resin powder and a plasticizer over the lacquer film, heating this paste until it gels, forcing this coated face against the zigzag end folds of the annulus to embed the end folds in the paste, and heating the disc while it is held against said end to the vinyl softening point to thereby transform the resin from a liquid dispersion to a continuous phase that will penetrate deep into the porous fibrous material and will also bond firmly to the lacquer film on the disc.

References Cited in the file of this patent

UNITED STATES PATENTS

| Number | Name | Date |
| --- | --- | --- |
| 2,122,111 | Poelman et al. | June 28, 1938 |
| 2,431,078 | Powell et al. | Nov. 18, 1947 |
| 2,468,862 | Briggs | May 13, 1949 |
| 2,550,232 | Donnell | Apr. 24, 1951 |
| 2,627,350 | Wicks | Feb. 3, 1953 |
| 2,642,187 | Bell | June 16, 1953 |
| 2,653,887 | Slayter | Sept. 29, 1953 |
| 2,663,660 | Layte | Dec. 22, 1953 |
| 2,689,652 | Gretzinger | Sept. 21, 1954 |